US012567250B1

(12) United States Patent
Rees

(10) Patent No.: US 12,567,250 B1
(45) Date of Patent: Mar. 3, 2026

(54) SYSTEM AND METHOD FOR PRODUCING HIGH-RESOLUTION IMAGE DATA USING LOW-RESOLUTION IMAGING SYSTEMS

(71) Applicant: Deere & Company, Moline, IL (US)

(72) Inventor: Steven Rees, Queensland (AU)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/989,913

(22) Filed: Dec. 20, 2024

(51) Int. Cl.
*G06V 20/10* (2022.01)
*A01P 13/00* (2006.01)

(52) U.S. Cl.
CPC ............ *G06V 20/188* (2022.01); *A01P 13/00* (2021.08)

(58) Field of Classification Search
CPC .. G06V 20/188; G06V 20/194; G06V 10/267; G01N 2021/8466; G01N 33/0098; A01P 13/00; G08B 13/19641; G08B 13/19643; G08B 13/19645
USPC .................. 348/143, 145, 151, 159; 382/110
See application file for complete search history.

(56) References Cited

U.S. PATENT DOCUMENTS

| | | | |
|---|---|---|---|
| 11,946,747 B2 | 4/2024 | Vandike et al. | |
| 11,957,072 B2 | 4/2024 | Blank et al. | |
| 11,983,009 B2 | 5/2024 | Vandike et al. | |
| 2017/0071188 A1 | 3/2017 | Rees | |
| 2023/0049590 A1 | 2/2023 | Bauer et al. | |
| 2024/0046479 A1* | 2/2024 | Padwick | A01M 7/0089 |

FOREIGN PATENT DOCUMENTS

EP 3839804 A1 6/2021

OTHER PUBLICATIONS

Rang M.H. Nguyen et al., "Training-Based Spectral Reconstruction from a Single RGB Image," European Conference on Computer Vision (ECCV 2014), Sep. 2014, 16 pages.
"Global Hyperspectral Imaging Spectral-library of Agricultural-Crops & Vegetation (GHISA)," USGS, Western Geographic Science Center, Aug. 5, 2018, 35 pages.
"Global Hyperspectral Imaging Spectral-library of Agricultural Crops (GHSIA), Area of Study: Conterminus United States (CONUS), Algorithm Theoretical Basis Document (ATBD)," USGS EROS (South Dakota), Aug. 2019. 25 pages.

* cited by examiner

*Primary Examiner* — Sherrie Hsia
(74) *Attorney, Agent, or Firm* — Jerry Turner Sewell; Lucian Wayne Beavers; Patterson Intellectual Property Law, PC

(57) ABSTRACT

A system and a method determine physical characteristics of plants positioned beneath respective spray units. The physical characteristics are determined by analyzing respective images of each plant using imaging devices. A first image of each plant is obtained using a respective low-spectral-resolution camera. A second image of at least one plant is obtained using a higher-spectral-resolution camera. A correlation coefficient or correlatable features are generated based on the spectral characteristics of the elements of the first image and the spectral characteristics of the elements of second image of the at least one plant. The correlation coefficient or correlatable features are applied to the elements of each first image of the other plants to produce a respective higher-spectral-resolution second image of each of the other plants. The spectral characteristics of the second images are analyzed to determine physical characteristics of the at least one plant and the other plants.

13 Claims, 7 Drawing Sheets

GENERATE A FIRST IMAGE OF A FIRST PLANT USING A FIRST TYPE OF IMAGER HAVING A FIRST SPECTRAL RESOLUTION

GENERATE A SECOND IMAGE OF THE FIRST PLANT USING A SECOND TYPE OF IMAGER HAVING A SECOND SPECTRAL RESOLUTION

CORRELATE THE RESPECTIVE FIRST IMAGE OF THE FIRST PLANT AND THE SECOND IMAGE OF THE FIRST PLANT TO GENERATE A CORRELATION COEFFICIENT MAPPING THE FIRST IMAGE OF THE FIRST PLANT TO THE SECOND IMAGE OF FIRST PLANT

GENERATE A RESPECTIVE FIRST IMAGE OF EACH OF A PLURALITY OF SECOND PLANTS USING THE FIRST TYPE OF IMAGER HAVING THE FIRST SPECTRAL RESOLUTION

APPLY THE CORRELATION COEFFICIENT TO THE RESPECTIVE FIRST IMAGE OF EACH OF THE SECOND PLANTS TO GENERATE A RESPECTIVE SECOND IMAGE OF EACH OF THE SECOND PLANTS

PERFORM SPECTRAL IMAGE ANALYSIS ON THE SECOND IMAGE OF THE FIRST PLANT TO DETERMINE A CHARACTERISTIC OF THE FIRST PLANT; AND SELECTIVELY APPLY MATERIAL TO THE FIRST PLANT BASED ON CHARACTERISTIC OF THE FIRST PLANT

PERFORM SPECTRAL IMAGE ANALYSIS ON THE RESPECTIVE SECOND IMAGE OF EACH OF THE SECOND PLANTS TO DETERMINE A RESPECTIVE CHARACTERISTIC OF EACH OF THE SECOND PLANTS; AND SELECTIVELY APPLY MATERIAL TO EACH OF THE SECOND PLANTS BASED ON THE CHARACTERISTIC OF EACH PLANT

600

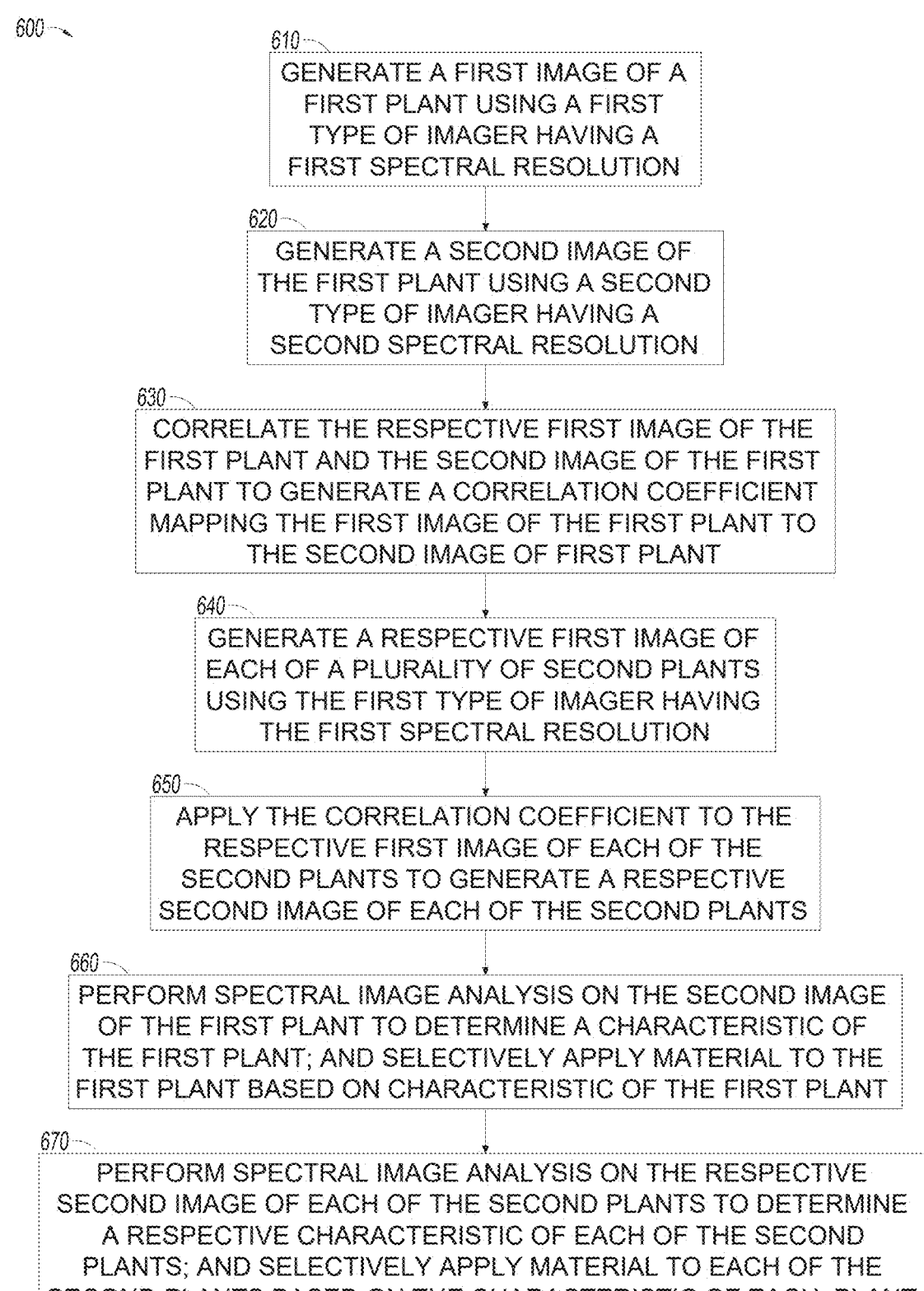

610
GENERATE A FIRST IMAGE OF A
FIRST PLANT USING A FIRST
TYPE OF IMAGER HAVING A
FIRST SPECTRAL RESOLUTION

620
GENERATE A SECOND IMAGE OF
THE FIRST PLANT USING A SECOND
TYPE OF IMAGER HAVING A
SECOND SPECTRAL RESOLUTION

630
CORRELATE THE RESPECTIVE FIRST IMAGE OF THE
FIRST PLANT AND THE SECOND IMAGE OF THE FIRST
PLANT TO GENERATE A CORRELATION COEFFICIENT
MAPPING THE FIRST IMAGE OF THE FIRST PLANT TO
THE SECOND IMAGE OF FIRST PLANT

640
GENERATE A RESPECTIVE FIRST IMAGE OF
EACH OF A PLURALITY OF SECOND PLANTS
USING THE FIRST TYPE OF IMAGER HAVING
THE FIRST SPECTRAL RESOLUTION

650
APPLY THE CORRELATION COEFFICIENT TO THE
RESPECTIVE FIRST IMAGE OF EACH OF THE
SECOND PLANTS TO GENERATE A RESPECTIVE
SECOND IMAGE OF EACH OF THE SECOND PLANTS

660
PERFORM SPECTRAL IMAGE ANALYSIS ON THE SECOND IMAGE
OF THE FIRST PLANT TO DETERMINE A CHARACTERISTIC OF
THE FIRST PLANT; AND SELECTIVELY APPLY MATERIAL TO THE
FIRST PLANT BASED ON CHARACTERISTIC OF THE FIRST PLANT

670
PERFORM SPECTRAL IMAGE ANALYSIS ON THE RESPECTIVE
SECOND IMAGE OF EACH OF THE SECOND PLANTS TO DETERMINE
A RESPECTIVE CHARACTERISTIC OF EACH OF THE SECOND
PLANTS; AND SELECTIVELY APPLY MATERIAL TO EACH OF THE
SECOND PLANTS BASED ON THE CHARACTERISTIC OF EACH PLANT

FIG. 8

SYSTEM AND METHOD FOR PRODUCING HIGH-RESOLUTION IMAGE DATA USING LOW-RESOLUTION IMAGING SYSTEMS

FIELD OF THE DISCLOSURE

The present disclosure relates generally to agricultural sprayers and other agricultural applicators that apply substances to a field. More specifically, the disclosure is directed to machine visualization of plants to control an agricultural sprayer or other agricultural applicator.

BACKGROUND

An agricultural applicator machine is configured to apply an agricultural substance (liquid or dry forms) to a field. One example of an agricultural applicator machine is an agricultural spraying machine or sprayer. An agricultural sprayer, for example, often includes a tank or reservoir that holds a substance to be sprayed on an agricultural field. Such systems typically include a supply line or conduit mounted on a foldable, hinged, or retractable and extendible boom. The supply line is coupled to one or more spray nozzles mounted along the boom. Each spray nozzle is configured to receive the substance and direct the substance to a crop or field during application. As the sprayer travels through the field, the boom is moved to a deployed position, and the substance is pumped from the tank or reservoir, through the nozzles, so that the material is selectively applied (e.g., sprayed onto) portions of the field.

Rather than relying solely on an operator to determine when and where to direct the substance being sprayed, automated systems were developed to control the sprayer. For example, a machine visualization unit focused on areas beneath the spray nozzles can detect the presence of plants in the areas, determine the types of plant, and determine whether to apply a substance to the plants. For example, if the substance is a herbicide, the visualization system can detect the presence of a weed and activate the spray for the area in which the weed is identified. If the substance is a material beneficial to a crop plant, the visualization system can detect the presence of crop plants, evaluate the health of the crop plants, and selectively apply the material to the crop plants in response to the evaluation.

Various image processing algorithms have been developed to identify plant growth. Many such algorithms utilize machine learning techniques to determine a type of plant (e.g., a desired crop plant or a weed or other undesired plant). Such algorithms can also determine the general health of a crop plant by comparing the images of the crop plant to known images of the crop plant representing various conditions of such plants. The algorithms can also be applied by extracting information (parameters) out of the images and applying the extracted information to a calibration set of images.

The determination accuracy of the image processing algorithms depends in part on the quality of the images provided to the algorithms. The quality of the images produced by a machine visualization unit depends on the spatial resolution of the images (e.g., the number of megapixels in each image frame) and also depends on the spectral resolution. A machine visualization unit such as a standard still image camera or video camera usually has three channels of spectral data that are generated by a matrix of red sensors, a matrix of green sensors, and a matrix of blue sensors. Each type of sensor has a peak response at a respective peak wavelength and responds to wavelengths over a band of wavelengths extending below and above the peak wavelength. The three bands of wavelengths overlap. An image pixel for a particular location in an image has a color that is created by combining the intensities of the sensed light for the corresponding red sensor, the corresponding green sensor, and the corresponding blue sensor at the particular location. Thus, an image pixel may represent a color other than red, green, and blue although the camera does have sensors for colors other than red, green, and blue. Such a camera may be referred to as an RGB camera.

A machine visualization unit may also be a multispectral camera or a hyperspectral camera that provides many more channels of color sensing. Instead of only the three channels of a conventional RGB camera, a multispectral camera or a hyperspectral camera may have 40 or more channels of spectral data. The spectral data includes data from sensors that are tuned to specific color wavelengths in addition to the conventional red, green, and blue peak wavelengths. Each color wavelength corresponds to a light frequency wherein a shorter wavelength corresponds to a higher light frequency and a longer wavelength corresponds to a lower light frequency. Furthermore, each pixel in each sensor has a narrower band so that the output of each pixel represents the intensity of a narrower range of frequencies (colors). Some multispectral and hyperspectral cameras can include spectral channels that extend to wavelengths greater than visual wavelengths (e.g., the near infrared spectral range) and to wavelengths less than visual wavelengths (e.g., the ultraviolet spectral range). As used herein, the channels of a multispectral camera can have overlapping spectral ranges and the channels of a hyperspectral camera can have nonoverlapping spectral ranges.

Although multispectral cameras and hyperspectral cameras extend the accuracy of identification of plant growth and the accuracy of analysis of plant health, such cameras are much more expensive than conventional three-channel RGB cameras. For example, in an agricultural sprayer having 32 spray nozzles to be individually controlled, the cost of providing a multispectral camera or a hyperspectral camera to produce images of the plants proximate to each nozzle would be prohibitively expensive in comparison to using an RGB camera proximate to each nozzle.

SUMMARY

In view of the foregoing, a need exists for a system and method for imaging plant growth on a multiple-unit agricultural applicator, such as an agricultural sprayer, using inexpensive RGB cameras while achieving improved imaging accuracy. The current disclosure describes a system and method that uses one multispectral camera or one hyperspectral camera and at least one RGB camera to image the same plant to generate a correlation coefficient or correlatable features between the low-spectral-resolution images and the multispectral-resolution images or the hyperspectral-resolution images. For example, the correlatable features can be one or more of shapes, textures, or spectra. The correlation coefficient or correlatable features are applied to low-spectral-resolution images of other plants produced by other RGB cameras to generate hyperspectral-resolution images of the other plants.

One aspect of the embodiments disclosed herein is a system and a method that determine a physical characteristic of plants positioned beneath respective spray units. The physical characteristic of each plant is determined by analyzing a respective image of each plant using imaging devices. A first image of each plant is obtained using a respective low-spectral-resolution camera. A second image of at least one plant is obtained using a higher-spectral-resolution camera. A correlation coefficient or correlatable features are generated based on the spectral characteristics of the elements of the first image and the spectral characteristics of the elements of second image of the at least one plant. The correlation coefficient or correlatable features are applied to the elements of each first image of the other plants to produce a respective higher-spectral-resolution image of each of the other plants. The spectral characteristics of the second images of the plants are analyzed to determine physical characteristics of the at least one plant and the other plants.

Another aspect of the embodiments disclosed herein is a method of using a plurality of imaging devices having a low spectral resolution for determining characteristics of a plurality of plants. The method comprises generating a respective first image of a first plant, wherein the first imaging device has a first spectral resolution. The method further comprises generating a second image of the first plant using a second imaging device having a second spectral resolution, wherein the second spectral resolution is greater than the first spectral resolution. The method correlates the second image of the first plant with the first image of the first plant to generate a correlation coefficient or correlatable features mapping the first image of the first plant to the second image of the first plant. The method generates a respective first image of at least one plant in a group of plants using a respective third imaging device for each respective plant in the group of plants, wherein each third imaging device has the first spectral resolution. The method applies the correlation coefficient or correlatable features to the respective first image of the at least one plant in the group of plants to produce a respective generated second image of the at least one plant in the group of plants. The respective generated second image of the at least one plant in the group of plants has the second spectral resolution. The method analyzes the spectral characteristics of the second image of the first plant to determine a respective physical characteristic of the first plant. The method analyzes the spectral characteristics of the respective generated second image of the at least one plant in the group of plants to determine a respective physical characteristic of the at least one plant in the group of plants.

In certain embodiments in accordance with this aspect, the first imaging device and the third imaging devices are RGB cameras having three channels of spectral resolution. The three channels comprise a red channel, a green channel, and a blue channel. The second imaging device is a hyperspectral camera having more than three channels of spectral resolution. In certain embodiments, the second imaging device has at least 40 channels of spectral resolution.

In certain embodiments in accordance with this aspect, the method selectively activates a first application mechanism positioned proximate to the first imaging device to apply a material to the first plant when the respective physical characteristic of the first plant has a first characteristic. The method selectively activates a respective second application mechanism positioned proximate to a respective third imaging device to apply the material to the at least one plant in the group of plants when the respective physical characteristic of the at least one plant in the group of plants has a second characteristic. In certain embodiments, the second characteristic is the same as the first characteristic.

In certain embodiments in accordance with this aspect, the first characteristic is a type of plant. In certain embodiments, the type of plant is a weed, and the material applied to the first plant and to the second plant is a herbicide.

In certain embodiments in accordance with this aspect, the first plant is a crop plant, the first characteristic is a relative health of the first plant, and the material applied to the plant is beneficial to the health of the plant. In such embodiments, the at least one plant in the group of plants is a crop plant, the second characteristic is a relative health of the at least one plant in the group of plants, and the material applied to the at least one plant in the group of plants is beneficial to the health of the at least one plant in the group of plants.

Another aspect of the embodiments disclosed herein is a crop evaluation system. The system comprises a first machine visualization unit of a first type that is oriented to use a first image acquisition technique to obtain a first image of the first plant. The first image of the first plant has a first spectral resolution. A machine visualization unit of a second type is oriented to use a second image acquisition technique to obtain at least a second image of the first plant having a second spectral resolution. The second spectral resolution is greater than the first spectral resolution. A second machine visualization unit of the first type is oriented to use the first image acquisition technique to obtain a first image of a second plant. The first image of the second plant has the first spectral resolution. The system includes a processing system configured to receive the first image of the first plant and the second image of the first plant. The processing system maps elements of the first image of the first plant to elements of the second image of the first plant to generate a correlation coefficient or correlatable features between the first image of the first plant at the first spectral resolution and the second image of the first plant at the second spectral resolution. The processing system is further configured to receive the first image of the second plant. The processing system applies the correlation coefficient or correlatable features to elements of the first image of the second plant to produce a generated second image of the second plant. The processing system is further configured to analyze the spectral characteristics of the second image of the first plant to determine at least one physical characteristic of the first plant; and to analyze the spectral characteristics of the generated second image of the second plant to determine at least one physical characteristic of the second plant.

In certain embodiments, in accordance with this aspect, the evaluation system further comprises a source of sprayable material, and at least a first spraying unit and a second spraying unit. The first and second spraying units are coupled to receive the sprayable material from the source of the sprayable material. The first spraying unit is positioned proximate to the first machine visualization unit of the first type and is positioned proximate to the first machine visualization unit of the second type. The second spraying unit is positioned proximate to the second machine visualization unit of the first type. The first spraying unit is controllable to selectively spray the sprayable material onto a first plant proximate to the first spraying unit in response to receiving a first command. The second spraying unit is controllable to selectively spray the sprayable material onto a second plant proximate to the second spaying unit in response to receiving a second command. The processing system is further configured to selectively send the first command to the first spraying unit to activate the first spraying unit in response to the determined at least one physical characteristic of the first plant, and to selectively send the second command to the second spraying unit to activate the second spraying unit in response to the determined at least one physical characteristic of the second plant.

In certain embodiments in accordance with this aspect, the at least one physical characteristic of the second plant is a type of plant. In certain embodiments, the type of the second plant is an unwanted plant; and the material applied to the second plant is a herbicide.

In certain embodiments in accordance with this aspect, the at least one physical characteristic of the second plant is a relative health of the second plant; and the material applied to the second plant is a material beneficial to the health of the second plant.

Numerous objects, features, and advantages of the embodiments set forth herein will be readily apparent to those skilled in the art upon reading of the following disclosure when taken in conjunction with the accompanying drawings.

BRIEF DESCRIPTION OF THE DRAWINGS

FIG. 8 is a flowchart of the method of operating the system of FIG. 6.

DETAILED DESCRIPTION

Figure 1:
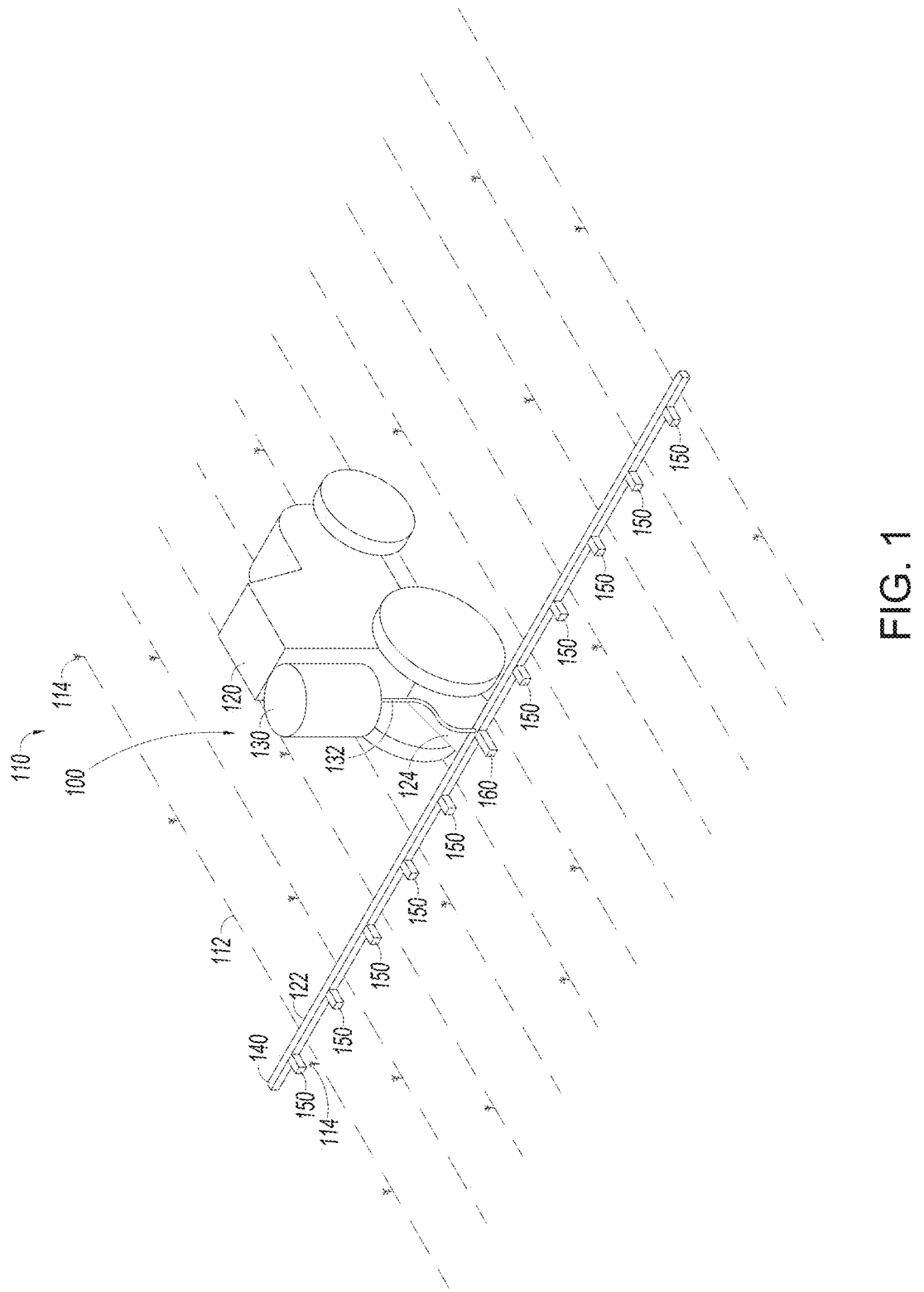
FIG. 1 illustrates is a pictorial illustration of an agricultural application system operating on a field, the agricultural application system including a structure that supports a plurality of applicator units.

FIG. 1 is pictorial illustration of an agricultural application system 100 in a field 110 having multiple ridges 112 (illustrated in dashed lines) in parallel rows. The field is illustrated as having a plurality of plants 114. The agricultural application system is illustrated as an agricultural sprayer; however, the embodiments disclosed herein are readily adaptable to other agricultural applications systems having multiple applicator devices that are controllable individually.

The agricultural application system 100 includes a tractor 120 or other source of mobility and a removeable applicator structure 122 attached to the tractor via a hinged mechanism

124. Although illustrated as a tractor and a removable applicator structure, the two apparatuses can be combined as an integral self-propelled application system.

The tractor 120 supports a material source (e.g., a container) 130 of a material to be applied to the field 110. For example, the material to be applied may be a herbicide to be sprayed on an undesired plant for weed control. The material may also be a fertilizer, another nutrient, an insecticide, or the like to be sprayed on a desired plant. The material to be applied is transported from the source to the applicator system by a conduit 132.

The removeable applicator structure 122 includes a support structure 140 that extends from the hinged mechanism 124 in two directions so that the support structure is extends over multiple cultivation rows on either side of the tractor 120. Although illustrated as a single unit, the support structure may include hinges (not shown) that allow all or a portion of the support structure to be raised for transportation or for applying material on only side of the tractor 120.

The support structure 140 supports a plurality of a first type of imager/applicator unit 150 and at least one second type of imager/applicator units. The imager/applicator units are spaced apart on the support structure by the approximate distance between the ridges 112 of the field 110. In FIG. 1, ten instances of the first type of imager/applicator unit are shown; however, additional instances of the first type of imager/applicator unit may be included for long versions of the support structure. For example, a particular embodiment may include 32 or more of the first type of imager/applicator units. Each of the first type of imager/applicator unit is aligned with a peak of a respective one of the ridges. The support structure further supports the at least one second type of imager/applicator unit 160, which is aligned with the peak of one of the ridges. In the illustrated embodiment, the second type of imager/applicator unit is shown in the approximate middle of the support structure; however, the second type of imager/applicator unit can also be located elsewhere on the support structure in the place of one of the first type of imager/applicator units.

Figure 2:
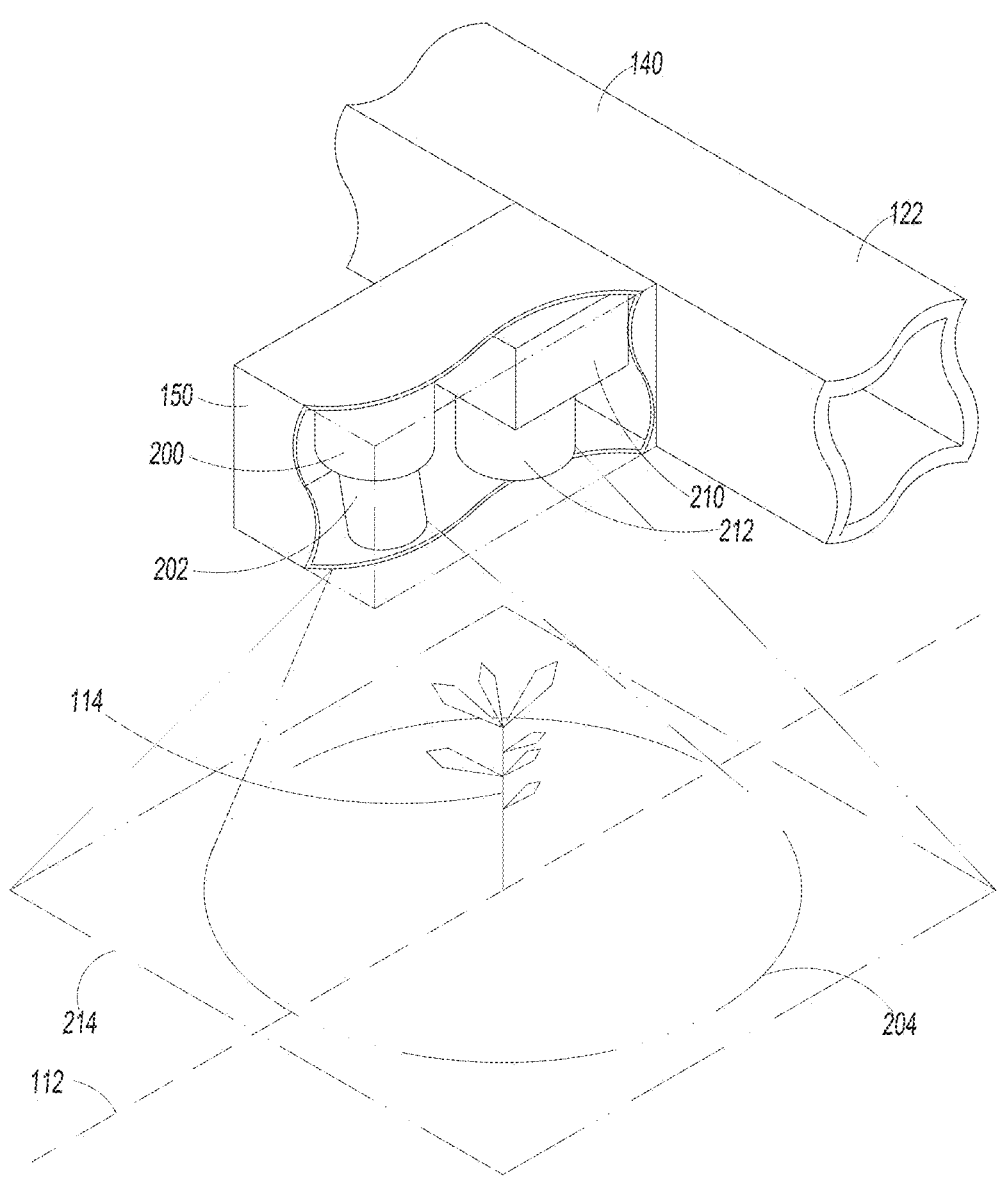
FIG. 2 illustrates an enlarged illustration of a first type of imager/applicator unit of the agricultural application system of FIG. 1, the first type of imager/applicator unit including a spray mechanism and including a low-spectral resolution imager (e.g., a machine visualization unit such as a camera) having a first spectral resolution.

As shown in FIG. 2, each of the first type of imager/applicator unit 150 comprises a controllable spray mechanism (applicator) 200 having a nozzle 202, which comprise the applicator portion of the unit. The nozzle is oriented to selectively spray material from the material source 130 (FIG. 1) onto a spray area 204 generally centered on the respective ridge 112 underlying the nozzle.

As further shown in FIG. 2, each of the first type of imager/applicator unit 150 also comprises an imager 210 of a first type. In the embodiment disclosed herein, the imager of the first type is a machine visualization unit such as a camera. The following references to a camera are intended to encompass other types of imagers and machine visualization units. The camera of the first type is described herein as an RGB camera and will be referred to as an RGB camera in the following description. Each RGB camera 210 has an associated lens 212. In the illustrated embodiment of FIG. 2, the RGB camera is directed perpendicularly downward toward the plant 114 generally beneath the camera. In other embodiments, the RGB camera can be directed forward, rearward, or to one of the sides. For example, in one embodiment (not shown), the camera is directed forward approximately 44 degrees from perpendicular.

Figure 3:
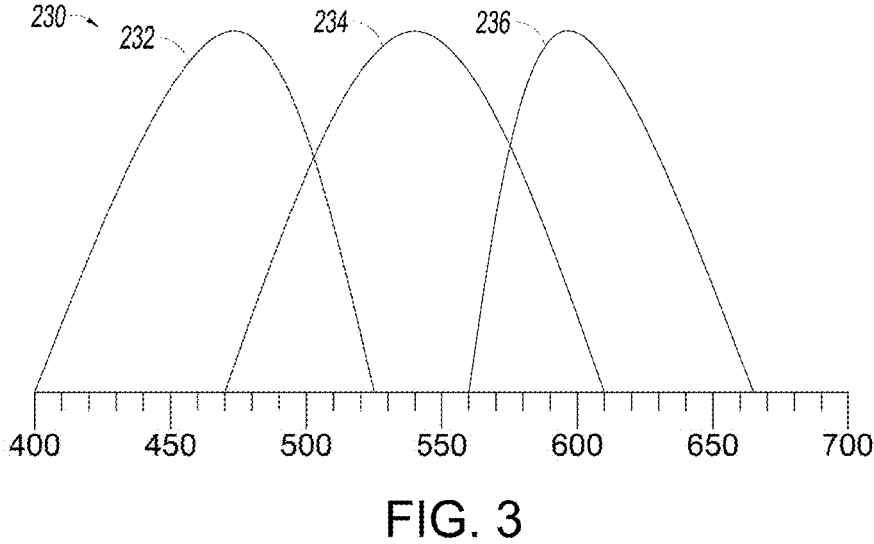
FIG. 3 illustrates a simplified spectrum of the low-spectral resolution imager of the first type of imager/applicator unit of FIG. 2.

In the illustrated embodiment, the RGB camera 210 can comprise a conventional RGB camera that receives light via three sensor arrays, wherein each sensor array comprises a matrix of sensors that are optimized for light sensitivity over a particular range of wavelengths. For example, as illustrated by a spectrum 230 in FIG. 3, a "blue" sensor is sensitive to light over a first range 232 of wavelengths from approximately 400 nanometers to approximately 525 nanometers with a peak sensitivity around 475 nanometers. A "green" sensor is sensitive to light over a second range 234 of wavelengths from approximately 400 nanometers to approximately 620 nanometers with a peak sensitivity around 540 nanometers. A "red" sensor is sensitive to light over a third range 236 of wavelengths from approximately 560 nanometers to approximately 675 nanometers with a peak sensitivity around 590 nanometers. Each sensor array outputs a digital value for each sensor in the array wherein the digital value for a sensor represents the intensity of the light in the particular wavelength range that impinges on the sensor. The digital values from corresponding sensor locations in each array are combined to form a pixel value that has three channels of color information—a red channel, a green channel and a blue channel. For example, each pixel value may be represented by 24 bits of data (3 bytes of data) with each 8 bit byte representing 256 intensity levels for each bandwidth. As illustrated in FIG. 3, the bandwidths for the three colors overlap such that other colors in the spectral range of 400 nanometers to 700 nanometers are detectable as intensities from sensors of two or more colors in in the sensor array. The RGB camera outputs data representing the red, green, and blue intensities in each image frame.

As is well known in the art, each RGB image created by each RGB camera 210 is stored as digital data representing the red intensity, the green blue intensity, and the blue intensity for each pixel of the image. Thus, for example, the image from a 16-megapixel RGB camera would occupy 15,772,256 storage locations for a pixel array of 5,312 pixels by 2,988 pixels. Each storage location may occupy 24 bits (3 bytes) when each color intensity is represented by 8 bits (256 levels). Each memory location may occupy more bits for greater color differentiation. The pixel data from the cameras are output as described below.

The RGB camera 210 and the lens 212 are adjusted to focus on a first image area 214, which generally encompasses the spray area 204. In the illustration, one of the plants 114 is shown within the spray area and the image area.

The foregoing description of the first type of imager/applicator unit 150 is one of many different configurations that can be used to position the RGB camera 210 and the spray mechanism 200 proximate to each other such that the imager is directed to the area onto which the material is to be applied (e.g., sprayed). In other embodiments, the first type of camera and the spray mechanism may be separate units that are independently mounted to the support structure 140.

Figure 4:
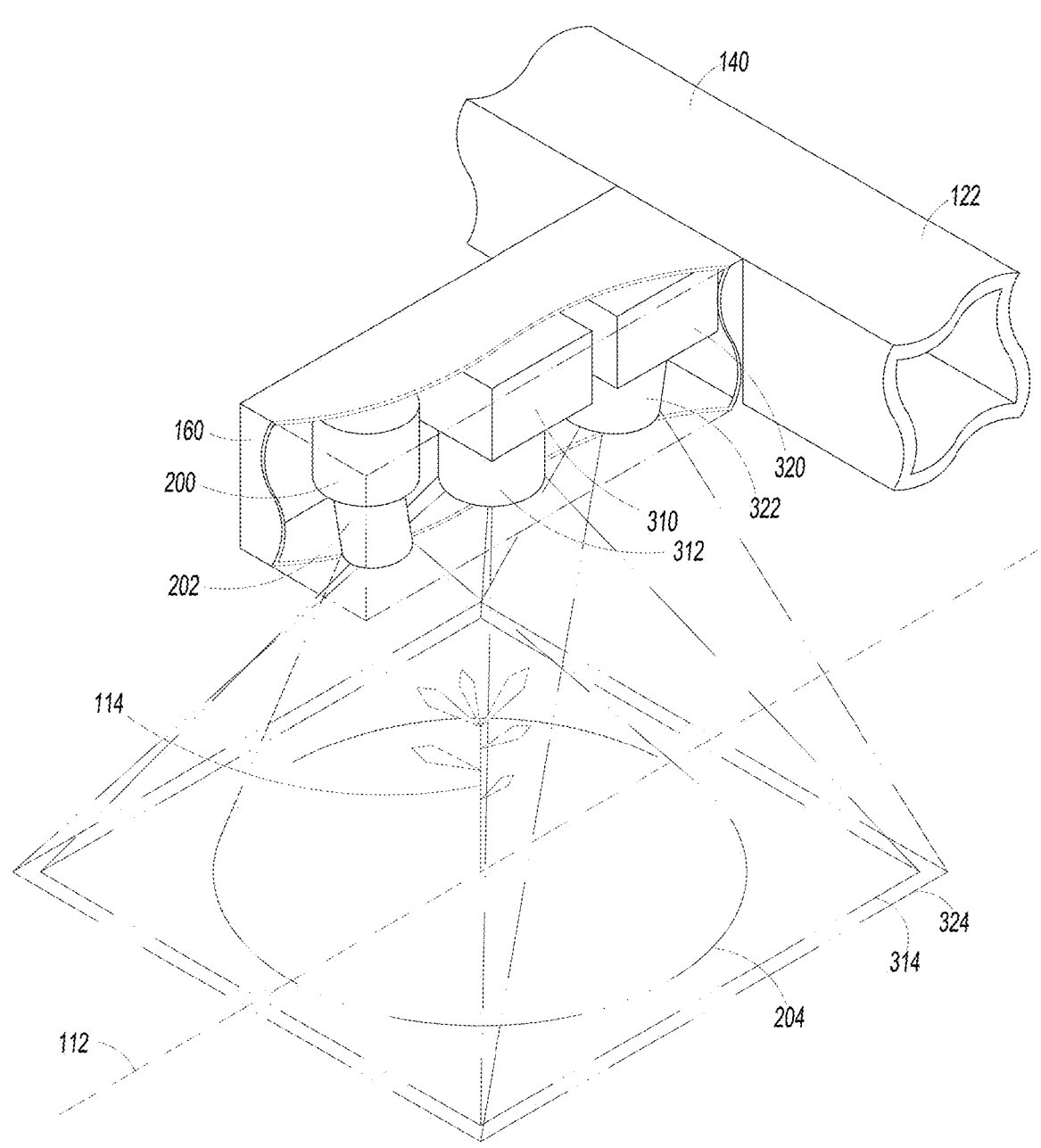
FIG. 4 illustrates an enlarged illustration of a second type of imager/applicator unit of the agricultural application system of FIG. 1, the second type of imager/applicator unit including a spray mechanism, a low-spectral-resolution imager having the first spectral resolution, and a higher-spectral-resolution imager having a second spectral resolution.

FIG. 4 illustrates the second type of imager/applicator unit 160 in more detail. Like, the previously described first type of imager/applicator unit 150 of FIG. 2, the second type of imager/applicator unit includes the spray mechanism 200 and the nozzle 202. The second type of imager/applicator unit also includes an imager of the first type (RGB camera) 310 and an associated lens 312, which correspond to the RGB camera 210 and the lens 212 as previously described for the first type of imager/applicator unit 150 of FIG. 2. The RGB camera and the associated lens in the second type of imager/applicator unit are adjusted to focus on a second image area 314 having a shape and size generally corresponding to the first image area 214 of FIG. 2.

Unlike the previously described first type of imager/applicator unit 150, the second type of imager/applicator unit 160 in FIG. 4 also includes an imager of a second type 320. As described below, the camera of the second type is a multispectral camera or a hyperspectral camera. As used herein, a multispectral camera has multiple channels (e.g., 40 channels) of overlapping spectral bands, and a hyperspectral camera has multiple channels (e.g., 40 channels) of nonoverlapping spectral bands. The following description is directed to the camera of the second type being a hyperspectral camera; however, the description is applicable to the camera of the second type being a multispectral camera. The description is also applicable to the camera of the second type having more than 40 channels of spectral bands. The hyperspectral camera and an associated lens 322 are adjusted to focus on a third image area 324, which at least partially overlaps the second image area 314. In FIG. 4, the third image area is shown as slightly larger in area than the second image area; however, the third image area may also have the same area as the second image area or may have a smaller area than the second image area. The third image area is also shown as having the same shape and orientation as the second image area. The images can be skewed and encompass different areas; however, conventional image processing can be used to reorient and resize one of the image areas with respect to the other imager area by recognizing common image features in the images generated by the first type of camera and the second type of camera in the second type of imager/applicator unit.

As discussed above with respect to the first type of imager/applicator unit 150, the second type of imager/applicator unit 160 can may also be configured with the RGB camera 310, the hyperspectral camera 320, and the spray mechanism 200 installed independently on the support structure 140.

Figure 5:
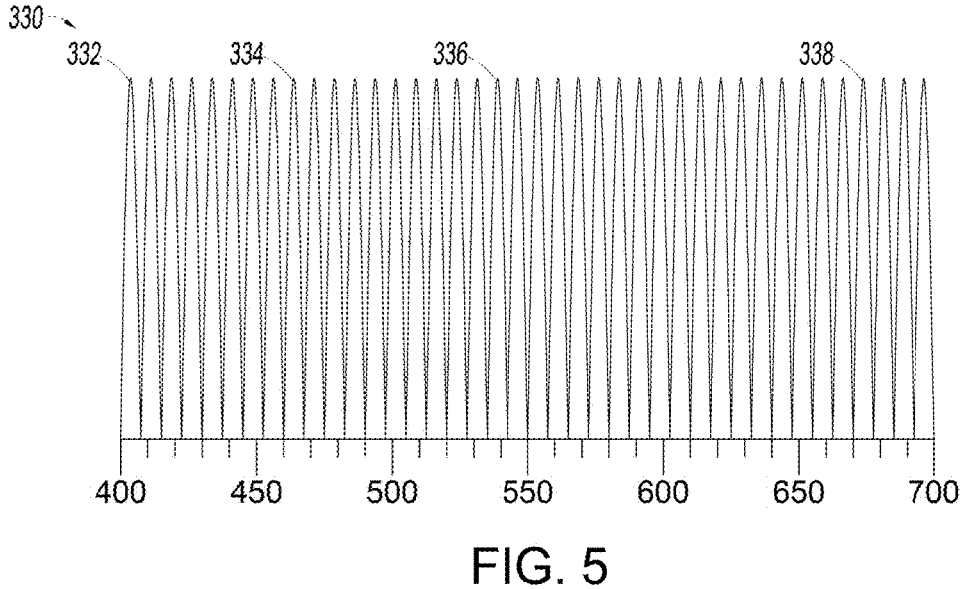
FIG. 5 illustrates a simplified spectrum of the higher-spectral-resolution imager of the second type of imager/applicator unit of FIG. 4.

In the illustrated embodiment, the hyperspectral camera 320 in the second type of imager/applicator unit 160 has 40 or more channels of spectral data spanning a range of wavelengths from 400 nanometers (blue) to 700 nanometers (red). The spectral bandwidth for an example of the hyperspectral camera is illustrated as a spectrum 330 in FIG. 5. As illustrated, the spectrum is divided into 40 bands of wavelengths between 400 nanometers and 700 nanometers although fewer or more bands may be used. Each band has an overall bandwidth of approximately 7.5 nanometers and represents the sensitivity of a particular sensor with the peak sensitivity of the sensor being approximately in the center of the illustrated bandwidth. Each band can overlap an adjacent band by a small amount (for example, if the camera of the second type is a multispectral camera); however, no overlap is illustrated in FIG. 5 for the illustrated embodiment using a hyperspectral camera. Each pixel location in the second type of camera has 40 sensors with each sensor sensitive to a respective one of the 40 bandwidths of light. For example, a sensor sensitive to a lowest band 332 of wavelengths from approximately 400 nanometers to approximately 407.5 nanometers has a peak sensitivity at approximately 403.75 nanometers corresponding to violet light. A sensor sensitive to a midrange band 334 of wavelengths from approximately 465 nanometers to approximately 472.5 nanometers has a peak sensitivity at approximately 468.75 nanometers corresponding to blue light. A sensor sensitive to an upper midrange band 336 of wavelengths from approximately 535 nanometers to approximately 542.5 nanometers has a peak sensitivity at approximately 538.75 nanometers corresponding to green light. A sensor sensitive to an upper band 338 of wavelengths from approximately 670 nanometers to approximately 677.5 nanometers has a peak sensitivity at approximately 673.75 nanometers corresponding to red light. The foregoing wavelengths may vary in different cameras and are used herein for illustration only. The camera of the second type provides output data representing each the intensity of the light for each bandwidth in each pixel location. For example, assuming 256 levels of intensity for each channel, which can be encoded as 8 bits of data, each pixel can require up to 10,240 bits (1,280 bytes) of raw data, which would result in outputting approximately 20.2 gigabytes of data from a 16 megapixel camera for each image frame. A suitable encoding technique can be used to reduce the amount of output data since many of the sensors associated with the 40 channels will not receive light in the respective bandwidths in each image frame.

Figure 6:
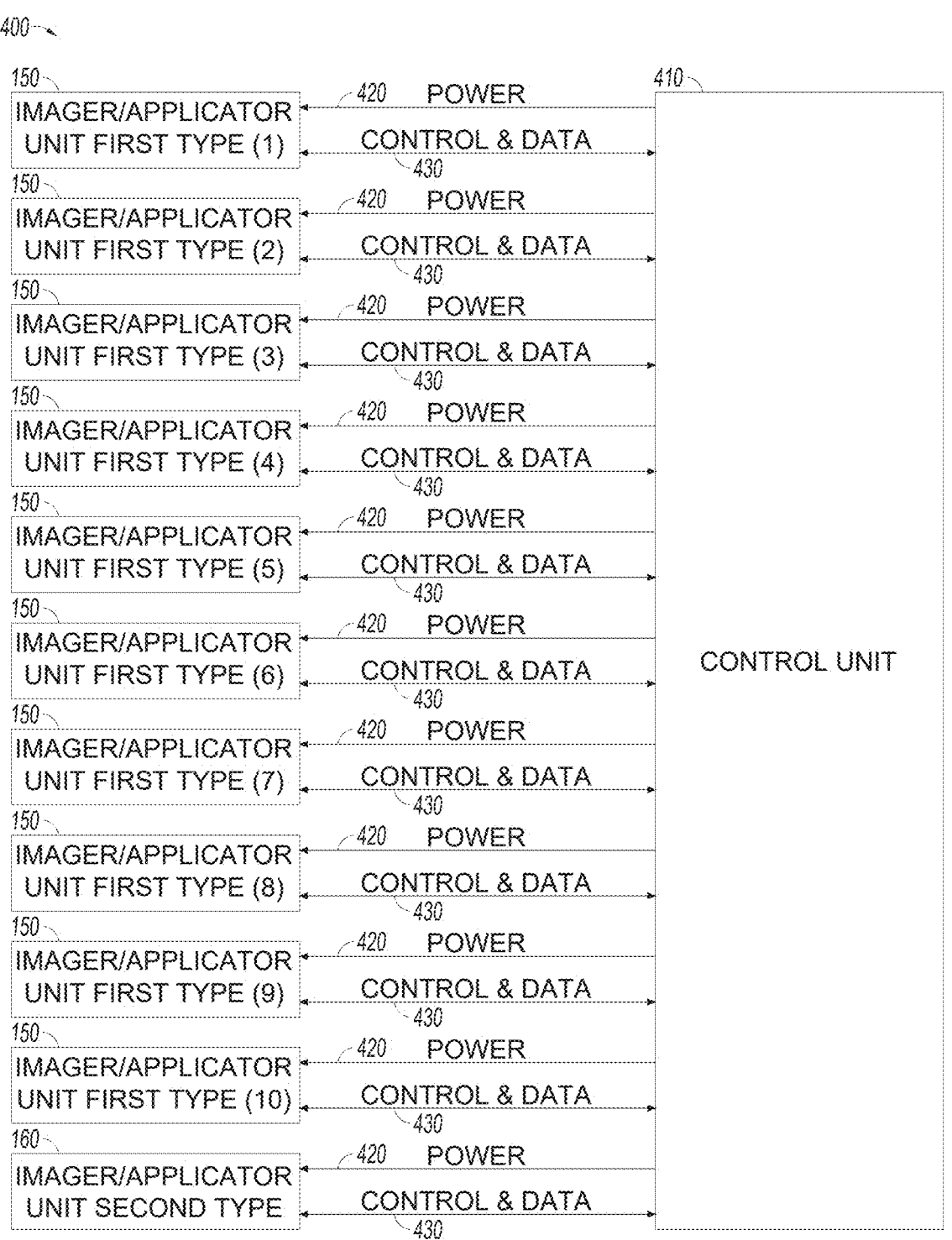
FIG. 6 is a simplified system block diagram showing interconnections between a control unit and the first type of imager/applicator units and the second type of imager/applicator unit of FIG. 1.

As illustrated in a simplified system block diagram 400 in FIG. 6, the ten first type of imager/applicator units 150 and the second type of imager/applicator unit 160 communicate control and information bidirectionally to and from a control unit 410. Many different configurations may be used to implement the bidirectional communications. In the simplified version illustrated in FIG. 6, the control unit includes a respective power cable 420 to each of the spray mechanisms 200 within the first type of imager/applicator units and to the spray mechanism within the second type of imager/applicator unit such that the control unit provides power to one of the spray mechanisms to activate the respective mechanism and removes power to deactivate the respective mechanism. In an alternative configuration (not shown), a single power cable can be provided to multiple spray mechanisms, and the control unit can send signals to control units (not shown) within the respective spray mechanisms to cause the control unit to selectively electrically connect power to the power cable as instructed. For example, the signals may be sent along a multiplexed bus, via dedicated low current signal lines, or via wireless communications. The system disclosed herein is not limited to a particular communication configuration for controlling the spray mechanisms.

The ten RGB cameras 210 in the first type of imager/applicator units 150 and the RGB camera 310 and the hyperspectral camera 320 of the second type of imager/applicator unit 160 also communicate with the control unit 410. The cameras may be wired directly to the control unit by using a respective control and data bus 430 as illustrated in FIG. 6 or by using ethernet cabling in a local area network (LAN) configuration or the like. In one embodiment, the local area network is a CAN (controller area network) bus. Alternatively, the cameras can communicate with the control unit via a wireless communication protocol.

In the selected configuration, each RGB camera 210 in the first type of imager/applicator units 150 sends data to the control unit 410 that represents an RGB image of the portion of the field in the respective first image area 214. The RGB camera 310 in the second type of imager/applicator unit 160 sends data to the control unit that represents an RGB image of the second image area 314. The hyperspectral camera 320 in the second type of imager/applicator unit sends data to the control unit that represents an hyperspectral image of the third image area 324.

Figure 7:
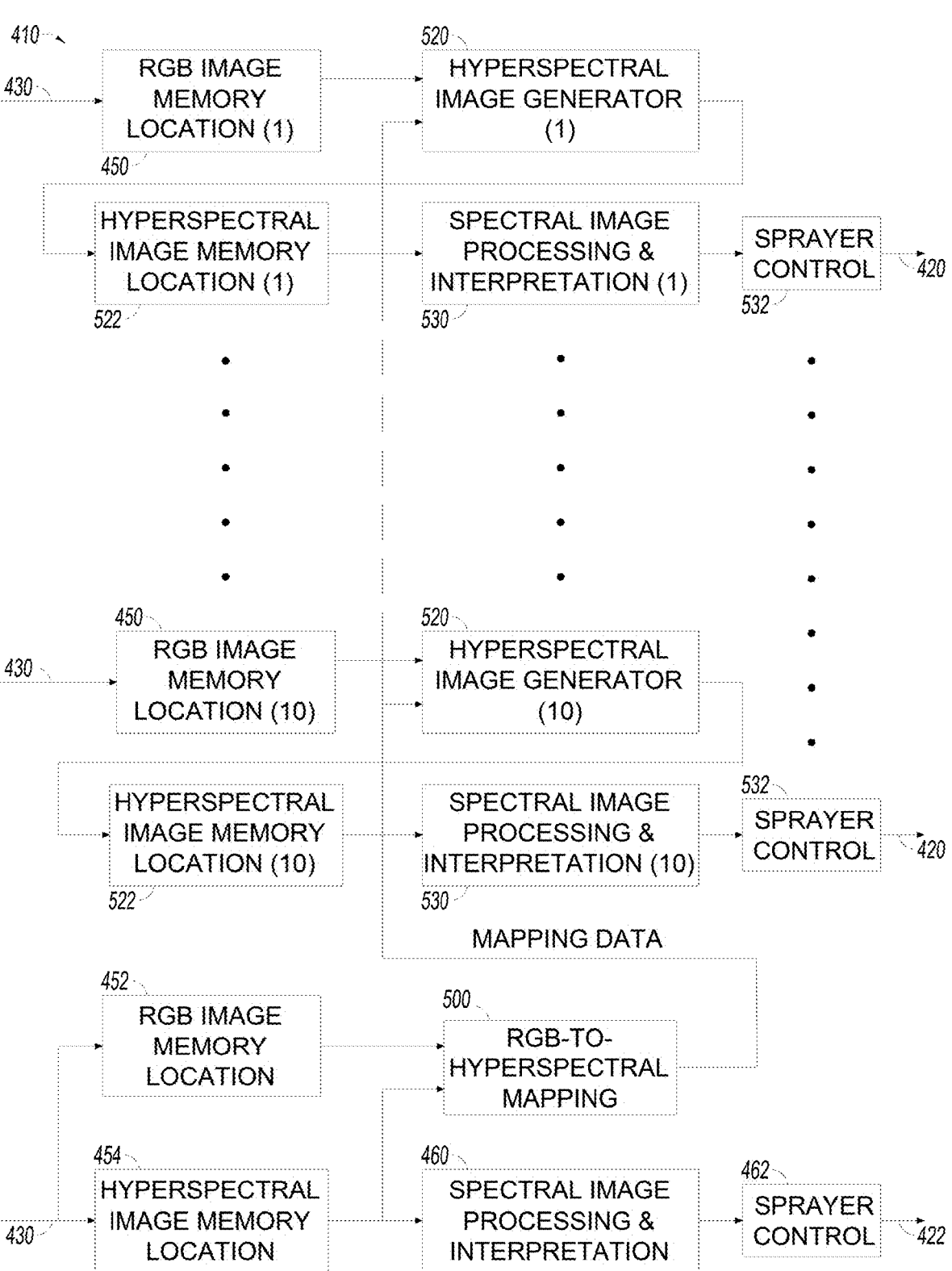
FIG. 7 illustrates a block diagram of the control unit of FIG. 6.

The control unit 410 is illustrated in more detail in FIG. 7. The control unit includes a respective RGB image memory storage location 450 associated with each of the ten first type of imager/applicator units 150 of FIG. 1. Each image memory storage location receives a respective RGB pixel image data from a respective RGB camera 210 in the first type of imager/applicator unit via the respective control and data bus 430. The control unit includes another RGB image memory location 452 to receive the RGB pixel image data from the RGB camera 310 in the second type of imager/applicator unit 160. The control unit includes an hyperspectral image memory location 454 to receive the hyperspectral pixel image data from the hyperspectral camera 320 of the second type in the second type of imager/applicator unit via the respective control and data bus 430.

The hyperspectral pixel image data stored in the hyperspectral image memory location 454 is applied as an input to a first hyperspectral image processing and interpretation unit 460. The first hyperspectral image processing and interpretation unit analyzes the hyperspectral pixel image data based on parameters provided to the unit to determine the type of plant growth, if any, in the image. For example, if the agricultural application system 100 (FIG. 1) is currently being used to selectively apply herbicide to unwanted plants in a soybean field, the parameters applied to the first hyperspectral image processing and interpretation unit are used to identify a soybean plant. If a plant other than a soybean plant is identified, the first hyperspectral image processing and interpretation unit outputs an application signal to a sprayer control unit 462, which sends an appropriate signal to the controllable spray mechanism 200 in the second type of imager/applicator unit to selectively turn on the spray mechanism to apply the herbicide to the unwanted plant. In similar manner, the first hyperspectral image processing and interpretation unit can receive parameters to identify a wanted plant (e.g., a soybean plant), evaluate the condition of the plant based on the parameters, and apply, for example, fertilizer, another nutrient, or an insecticide to the plant by outputting an application signal as discussed above. The image processing and evaluation to accomplish the foregoing functions are well known with respect to agricultural imaging and are not described in detail herein. See, for example, "Global Hyperspectral Imaging Spectral-library of Agricultural crops (GHISA); Area of Study: Conterminous United States (CONUS); Algorithm Theoretical Basis Document (ATBD)," August 2019 Version 2.0, USGS, Sioux Falls, South Dakota. Because of the multiple bands (e.g., 40 bands) of spectral imaging provided by such cameras, images from the camera can be processed using known algorithms to identify the types of plant material (e.g., crops such as corn, rice cotton, soybeans, and the like, as well as non-crops such as weeds). The algorithms are able to identify the condition of an imaged crop to detect diseases, water content, pests, nutrients, or the like.

The hyperspectral camera 320 of the second type in the second type of imager/applicator unit 160 is able to provide hyperspectral images of only the plants in the respective ridge 112 immediately below the position of the hyperspectral camera. Thus, the RGB cameras 210 in the first type of imager/applicator units 150 provide images of plants beneath the first type of imager/applicator units. Although the cameras in the first type of imager/applicator units could also be hyperspectral cameras, hyperspectral cameras cost much more than conventional RGB cameras. The additional cost of providing hyperspectral cameras for each the ten first type of imager/applicator units would be prohibitively expensive for a support structure having only 11 imager/applicator units 150,160 as illustrated. The difference in cost would be much greater for a larger support structure 140 having, for example, 32 imager/applicator units. Thus, as described above, the first type of imager/applicator units utilize the much-less-expensive RGB cameras. However, the RGB pixel data from the RGB camera cannot be used to process and evaluate the plants imaged beneath the RGB cameras.

The control unit 410 of FIG. 6 includes additional processing elements that enable the control unit to utilize the RGB pixel data from the RGB cameras 210 to determine the characteristics of the plants located beneath the cameras.

The control unit includes a RGB-to-hyperspectral mapping system (correlation unit) 500 that correlates the RGB image from the RGB camera 310 in FIG. 4 to the hyperspectral image from the hyperspectral camera 320 in FIG. 4. The mapping system receives the RGB pixel image data from the RGB memory location 452 that stores the image data generated by the RGB camera 310 in the second type of imager/applicator unit 160. The RGB pixel image data represents the second image area 314 in FIG. 4. The mapping system also receives the hyperspectral pixel data from the hyperspectral memory location 454 that stores the image data generated by the hyperspectral camera in the second type of imager/applicator unit. The hyperspectral image data represents the area 324 in FIG. 4.

The mapping system 500 first de-skews and resizes the two images with respect to each other. Deskewing and resizing of images to enable two images to be compared is well known in the art and is described in detail herein. Because the RGB image data comprises fewer memory locations than the hyperspectral data, the data for the RGB image is modified with respect to the fixed hyperspectral data. If the spatial pixel images sizes are the same (e.g., both images are 16-megapixel (5,312-pixel by 2,988-pixel) images), the two images are ready for the next step. If, for example, one image has a different number of pixels (e.g., 4 megapixels instead of 16 megapixels) or has a different aspect ratio, one of the images can be modified by interpolation or another known technique to conform the two images so that each pixel in one image represents the same image as the correspondingly located pixel in the other image.

Numerous techniques are known and may be used to create mapping data (e.g., correlation coefficient or correlatable features) for converting an hyperspectral image to an RGB image. In one form of image mapping, each possible RGB pixel combination (e.g., an 8-bit R value; an 8-bit G value; and an 8-bit B value) is used as an index value to the map. As the pixels in the RGB image are evaluated (across each row in sequence) the RGB combination at each pixel location is used as the index to the map. The hyperspectral value for the corresponding pixel location of the hyperspectral image is stored at a location corresponding to the index value. When the last row of the pixel image is complete, a partial map is created that includes a hyperspectral value for each RGB combination found in the RGB image from the RGB camera 310 in the second type of imager/applicator unit 160. For the RGB combinations not identified in the RGB image from the RGB camera in the first type of imager/applicator unit, interpolation can be used to fill in the hyperspatial values from the nearest identified RGB values. The interpolation can occur as the mapping is created, or the interpolation can occur as the mapping is used as described below. If during the mapping process, a particular RGB index value occurs at another pixel location in an image pixel in the RGB image and the hyperspectral value in the corresponding location of the hyperspectral image differs from the previously stored hyperspectral value in the map, the two different hyperspectral values can be reconciled using known techniques. Other mapping techniques may also be used.

The mapping data (correlation coefficient or correlatable features) from the mapping system 500 is provided as an input to a respective hyperspectral image generator 520 associated with each of the RGB image memory storage locations 450 that store images from the RGB cameras 210 in the first type of imager/applicator units 150. The RGB pixel data in each pixel in each row is read out in order and used as an index to the mapping data in the respective hyperspectral image generator. Each index value results in hyperspectral data being output from the hyperspectral image generator. The hyperspectral data is stored in a respective hyperspectral memory 522 associated with a respective first type of imager/applicator unit 150. If the mapping information is not filled for a particular index value, interpolation may be used to generate hyperspectral data for the corresponding pixel in the hyperspectral memory.

The outputs of each hyperspectral memory 522 for the images from the RGB cameras 210 of the first type of imager/applicator units 150 are provided as inputs to respective second hyperspectral image processing and interpretation units 530 that correspond to the first hyperspectral image processing and interpretation unit 460 described above. Each second hyperspectral image processing and interpretation unit receives the parameters received by the first hyperspectral image processing and interpretation unit and selectively generates a corresponding application signal to a respective sprayer control unit 532. Each sprayer control unit sends an appropriate signal to the controllable spray mechanism 200 in the first type of imager/applicator unit to turn on the mechanism to selectively apply a herbicide to an unwanted plant or to selectively spray a beneficial material to a wanted plant.

The control unit 410 may be located in various locations with respect to the tractor 120 and the removeable applicator structure 122. For example, in one embodiment, the control unit is located in the tractor so that the electronics of the control unit benefit from the air conditioned environment of the tractor.

The control unit 410 of FIGS. 6 and 7 operates in accordance with the flowchart 600 of FIG. 8. In a first step 610 of the operation, the control unit sends instructions to the RGB camera 310 (the camera of the first type) in the second type of imager/applicator unit 160 to cause the RGB camera to create an image within the second image area 314 (FIG. 4). The image may include an image of a plant 114. As discussed above, the RGB camera has a first spectral resolution as illustrated in FIG. 3. The image information is communicated to the control unit via the control and data bus 430 or via the LAN (not shown) in accordance with the communication configuration.

In a second step 620 of the operation, the control unit 410 sends instructions to the hyperspectral camera 320 (the camera of the second type) in the second type of imager/applicator unit 160 to cause the hyperspectral camera to create a second image within the third image area 324 (FIG. 4). As discussed above, the hyperspectral camera has a higher spectral resolution as illustrated in FIG. 5. The image information is communicated to the control unit via the control and data bus 430 or via the LAN (not shown) in accordance with the communication configuration. The instructions sent to the hyperspectral camera are synchronized with the instructions sent to the RGB camera in the first step 610 such that the two image include the same plant 114, if any, so that the two images may be compared as described above.

In a third step 630 of the operation, the control unit 410 correlates the first image from the RGB camera 310 in the second type of imager/applicator unit 160 with the second image from the hyperspectral camera 320 in the second type of imager/applicator unit to generate a correlation coefficient or correlatable features (mapping data) that maps the low-resolution color information in the first image to the higher color information in the second image as described above.

In a fourth step 640 of the operation, the control unit 410 sends respective instructions to each of the RGB cameras 210 in the first type of imager/application units 150 to cause each RGB camera to create an image within the respective first image areas 214 (FIG. 2). Each image may include an image of a respective second plant 114. The image information from each RGB camera in each of the first type of imager/applicator units is communicated to the control unit via the respective control and data bus 430 or via the LAN (not shown) in accordance with the communication configuration.

In a fifth step 650 of the operation, the control unit 410 applies the correlation coefficient or correlatable features (mapping data) generated in the third step 630 to the low-resolution color information in each of the first images generated in the fourth step 640 to produce a respective generated hyperspectral second image.

In a sixth step 660 of the operation, the control unit 410 performs spectral analysis on the second image of the first plant 114 in the third image area 324 (FIG. 4) to determine a respective characteristic of the plant. For example, when the agricultural application system 100 (FIG. 1) is configured to apply a herbicide to unwanted plants (e.g., weeds), the spectral analysis may identify the plant as a weed, and the control unit will activate the controllable spray mechanism 200 in the second type of imager/applicator unit 160 to spray the herbicide on the plant. In another example, when the agricultural application system is configured to selectively apply fertilizer, another nutrient, an insecticide, or the like on a plant, the result of the spectral analysis may determine whether the condition of the plant indicates that the plant needs the material to be sprayed, and, if so, selectively activate the controllable spray mechanism in the second type of imager/applicator unit to apply the material to the plant.

In a seventh step 670 of the operation, the control unit 410 performs spectral analysis on the generated hyperspectral second image of each second plant 114 in each respective first image area 214 (FIG. 2) to determine a respective characteristic of the plant. As described above, the applied material may be a herbicide for a weed or a beneficial material for a crop plant.

The method illustrated in FIG. 6 is repeated as the agricultural application system 100 proceeds down the field 110.

It should be understood from the foregoing description that the operations performed by the control unit 410 can be performed in a centralized control unit as illustrated. Alternatively, the processing described above can be distributed among the described devices. For example, when the communications between the devices is implement as a CAN bus, each first type of imager/applicator unit 150 and the second type of imager/applicator unit 160 may include an onboard controller (not shown) with a CAN bus compatible interface (not shown). Thus, the control unit may send the correlation coefficient or correlatable features (mapping data) to each first type of imager/applicator unit so that the onboard controller can generate a respective hyperspectral image from the RGB data generated by the respective RGB camera. In a further alternative, each onboard controller can perform the spectral analysis on the respective hyperspectral image and control the respective controllable spray mechanism 200. In such an embodiment, the control unit initializes each onboard controller with the parameters needed to identify the expected plants and to characterize the conditions of the plants.

It should be understood from the foregoing description that by having the hyperspectral camera 320 and the associated RGB camera 310 in the second type of image/applicator unit 160 carried on the support structure 140 with the RGB cameras 210 in the first type of imager/applicator units 150, any changes in the imaging conditions (e.g., time of day, cloudiness, type of crop being imaged, type of soil, residue on the field, or the like) will be incorporated into the generation of an updated correlation coefficient or updated correlatable features. The updated correlation coefficient or updated correlatable feature are applied to the first images from the RGB cameras in the first type of imager/applicator units.

The foregoing usage of a correlation coefficient or correlatable features to leverage relatively low spectral resolution cameras to create higher spectral resolution images can also be used to implement relatively inexpensive cameras for other measurement purposes. For example, the second type of imager/applicator unit 160 can include a stereo camera as the camera 320 of the second type to provide convolutional neural network (CNN) depth measurements. A correlation coefficient or correlatable features can be generated by comparing the images and the depth measurement with the images of the monocular RGB camera 310 of the first type so that the RGB cameras 210 in the first type of imager/applicator units 150 may also be used to provide respective depth measurements.

As another example of using a correlation coefficient or correlatable features to leverage the low resolution cameras, an ultrasonic height sensor can be included in the second type of imager/applicator unit 160. The height measurement in the Z-axis in combination with the area measurements in the X-axis and the Y-axis can be used to determine the actual biomass of the plant imaged by the RGB camera 310 in the second type of imager/applicator unit. The plants imaged by the RGB cameras 210 in the first type of imager/applicator units 150 having the same area measurements can be assumed to have the same height and the corresponding biomass. Although described herein as an agricultural application system having applicator devices, the foregoing description also applies to a crop imaging system that evaluates the characteristics of plants without applying material in response to the results of the evaluation. For example, the system described herein may generate and store geolocatable data based on the camera outputs and the evaluations of the camera outputs.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method of using a plurality of imaging devices having a low spectral resolution for determining characteristics of a plurality of plants, the method comprising:

generating a respective first image of a first plant using a first imaging device having a first spectral resolution;

generating a second image of the first plant using a second imaging device having a second spectral resolution, the second spectral resolution greater than the first spectral resolution;

correlating the second image of the first plant with the first image of the first plant to generate a correlation coefficient or correlatable features mapping the first image of the first plant to the second image of the first plant;

generating a respective first image of at least one plant in a group of plants using a respective third imaging device for each respective plant in the group of plants, each third imaging device having the first spectral resolution;

applying the correlation coefficient or correlatable features to the respective first image of the at least one plant in the group of plants to produce a respective generated second image of the at least one plant in the group of plants, the respective generated second image of the at least one plant in the group of plants having the second spectral resolution;

analyzing the spectral characteristics of the second image of the first plant to determine a respective physical characteristic of the first plant; and analyzing the spectral characteristics of the respective generated second image of the at least one plant in the group of plants to determine a respective physical characteristic of the at least one plant in the group of plants.

2. The method as defined in claim 1 wherein:

the first imaging device and the third imaging devices are RGB cameras having three channels of spectral resolution comprising a red channel, a green channel, and a blue channel; and the second imaging device is a hyperspectral camera having more than three channels of spectral resolution.

3. The method as defined in claim 2 wherein the second imaging device has at least 40 channels of spectral resolution.

4. The method as defined in claim 1 further comprising:

selectively activating a first application mechanism positioned proximate to the first imaging device to apply a material to the first plant when the respective physical characteristic of the first plant has a first characteristic; and selectively activating a respective second application mechanism positioned proximate to a respective third imaging device to apply the material to the at least one plant in the group of plants when the respective physical characteristic of the at least one plant in the group of plants has a second characteristic.

5. The method as defined in claim 4 wherein the second characteristic is the same as the first characteristic.

6. The method as defined in claim 5 wherein the first characteristic is a type of plant.

7. The method as defined in claim 6 wherein:

the type of plant is a weed; and the material applied to the first plant and to the second plant is a herbicide.

8. The method as defined in claim 4 wherein:

the first plant is a crop plant, the first characteristic is a relative health of the first plant, and the material applied to the plant is beneficial to the health of the plant; and the at least one plant in the group of plants is a crop plant, the second characteristic is a relative health of the at least one plant in the group of plants, and the material applied to the at least one plant in the group of plants is beneficial to the health of the at least one plant in the group of plants.

9. A crop evaluation system, the system comprising:

a first machine visualization unit of a first type oriented to use a first image acquisition technique to obtain a first image of a first plant, the first image of the first plant having a first spectral resolution;

a first machine visualization unit of a second type positioned proximate to the first machine visualization unit of the first type and oriented to use a second image acquisition technique to obtain at least a second image of the first plant having a second spectral resolution, the second spectral resolution greater than the first spectral resolution;

a second machine visualization unit of the first type oriented to use the first image acquisition technique to obtain a first image of a second plant, the first image of the second plant having the first spectral resolution;

a processing system configured to:

receive the first image of the first plant and the second image of the first plant;

map elements of the first image of the first plant to elements of the second image of the first plant to generate a correlation coefficient or correlatable features between the first image of the first plant at the first spectral resolution and the second image of the first plant at the second spectral resolution;

receive the first image of the second plant;

apply the correlation coefficient or correlatable features to elements of the first image of the second plant to produce a generated second image of the second plant;

analyze the spectral characteristics of the second image of the first plant to determine at least one physical characteristic of the first plant; and analyze the spectral characteristics of the generated second image of the second plant to determine at least one physical characteristic of the second plant.

10. The crop evaluation system of claim 9 further wherein:

the crop evaluation system further comprises a source of sprayable material, and at least a first spraying unit and a second spraying unit, wherein:

the first and second spraying units are coupled to receive the sprayable material from the source of the sprayable material;

the first spraying unit is positioned proximate to the first machine visualization unit of the first type and is positioned proximate to the first machine visualization unit of the second type;

the second spraying unit is positioned proximate to the second machine visualization unit of the first type;

the first spraying unit is controllable to selectively spray the sprayable material onto a first plant proximate to the first spraying unit in response to receiving a first command; and the second spraying unit is controllable to selectively spray the sprayable material onto a second plant proximate to the second spaying unit in response to receiving a second command; and the processing system is further configured to:

selectively send the first command to the first spraying unit to activate the first spraying unit in response to the determined at least one physical characteristic of the first plant; and selectively send the second command to the second spraying unit to activate the second spraying unit in response to the determined at least one physical characteristic of the second plant.

11. The crop evaluation system of claim 10 wherein the at least one physical characteristic of the second plant is a type of plant.

12. The crop evaluation system of claim 11 wherein:

the type of the second plant is an unwanted plant; and the material applied to the second plant is a herbicide.

13. The crop evaluation system of claim 10 wherein:

the at least one physical characteristic of the second plant is a relative health of the second plant; and the material applied to the second plant is a material beneficial to the health of the second plant.

\* \* \* \* \*